US006418151B1

(12) United States Patent
Walter et al.

(10) Patent No.: US 6,418,151 B1
(45) Date of Patent: Jul. 9, 2002

(54) AUTOMATIC PRIMARY REFERENCE CLOCK SWITCHING FOR SYNCHRONOUS NETWORKS

(75) Inventors: Harald Michael Walter, Nuremberg; Robert Franz Wenzel, Obermichelbach, both of (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/034,664

(22) Filed: Mar. 3, 1998

(30) Foreign Application Priority Data

May 3, 1997 (DE) .......................... 197 08 506

(51) Int. Cl.[7] .................................. H04J 3/06
(52) U.S. Cl. ..................... 370/503; 370/507; 375/356
(58) Field of Search ................. 370/503, 509, 370/510, 512, 513, 501, 516, 478, 479, 520; 378/354, 356; 375/355, 357, 326, 362, 364

(56) References Cited

U.S. PATENT DOCUMENTS

| 5,841,779 | A | * | 11/1998 | Kainulainen | ................ 370/514 |
| 5,878,095 | A | * | 3/1999 | Kainulainen | ................ 370/503 |
| 5,886,996 | A | * | 3/1999 | Wolf | ................ 370/507 |
| 6,041,066 | A | * | 3/2000 | Meki | ................ 370/512 |
| 6,134,234 | A | * | 10/2000 | Kapanen | ................ 370/503 |
| 6,262,996 | B1 | * | 7/2001 | Kainulainen | ................ 370/503 |

* cited by examiner

*Primary Examiner*—Douglas Olms
*Assistant Examiner*—Ricardo M. Pizarro

(57) ABSTRACT

Automatic switching between clock sources in synchronous networks is accomplished using Synchronous Status Message transmitted over the network and a control circuit positioned between SASE (Stand Alone Synchronization Equipment) and a network element (SDH-NE, Synchronous Digital Hierarchy Network Element).

7 Claims, 4 Drawing Sheets

AUTOMATIC PRIMARY REFERENCE CLOCK SWITCHING FOR SYNCHRONOUS NETWORKS

BACKGROUND OF THE INVENTION

1. Field of the Invention

The invention relates to synchronous networks and more particularly to switching a primary reference clock source in a synchronous network.

2. Description of the Related Art

The characteristics of a primary reference clock (PRC) are established in the ITU-T Recommendation G.811 and in ANSI Level 1. Simplified, it deals with a reference clock supply, which makes available a clock or synchronization signal having a long term deviation as against UTC (Universal Time Coordinated) of at the most $1 \times 10 \exp(-11)$. The generation of this time signal can occur completely autonomously. However, it can also occur with dependence on sources of signals derived from the UTC directly.

A device which generates a PRC clock contains, as a rule, a source of signals and a signal processor, as well as an output interface. With an autonomous PRC, the source of signals is a highly stable reference oscillator, which is implemented as a cesium oscillator, maser oscillator, or rubidium oscillator. For non-autonomous generation of the time signal this reference oscillator itself is synchronized to an external signal. This can be derived from a GPS (Global Positioning System) receiver or a receiver of time signals of a different kind, e.g. DCF77, LORAN-C, GLONASS. The output interface makes available a clock or data signal which is derived directly from the signal of the reference oscillator. For output signals there is a choice of 2048 kHz, 2048 kbit/s, 1544 kbit/s, 1 MHz, 5 MHz or 10 MHz according to G.811, with other signals conceivable there as well. For reasons of availability the reference oscillator and the output interface are often provided redundantly. The signal processing then selects, dependent on many criteria, one of the reference oscillator signals or else an average value signal for the output interface. The configuration and alarm indicator of the PRC occurs via a service terminal. The service terminal, connected via a data line, can also be located elsewhere.

In order to increase the availability of PRCs, these are, as a rule, extant doubly in the network. In order to provide better protection against external influences, it is recommended to position the PRCs in geographically diverse locations (replacement switching of geographically redundant PRCs). This so-called geographic redundancy guarantees the highest availability. If one PRC fails, the other PRC remaining in the network must take over the central clock generation. One PRC functions as master (PRC1) in the network, while the other one functions as slave (PRC2). For the slave itself to become master if the master fails, it must obtain the information about the failure of the master. To that end, customarily, a separate data channel is used in the SDH network (Synchronous Digital Hierarchy), for example a 64 kbit/s data line; compare FIG. 3. On this data channel the state information of the master is transferred to the slave, and vice versa. Such a solution is especially expensive and cost intensive, because for the coupling and decoupling of the data signal into the STM signal (Synchronous Transport Multiplex) separate equipment is necessary. Besides, this channel must be installed likewise doubly or redundantly in order to make available an alternate routing in case of outage.

SUMMARY OF THE INVENTION

The present invention provides automatic switching of primary clock reference sources in case of reference malfunction in a SDH network. One clock source is treated as a master and another clock source is treated as a slave. Switching between the master and slave is controlled using a Synchronization Status Message which is communicated over the network.

DESCRIPTION OF THE PREFERRED EMBODIMENT

Figure 2:
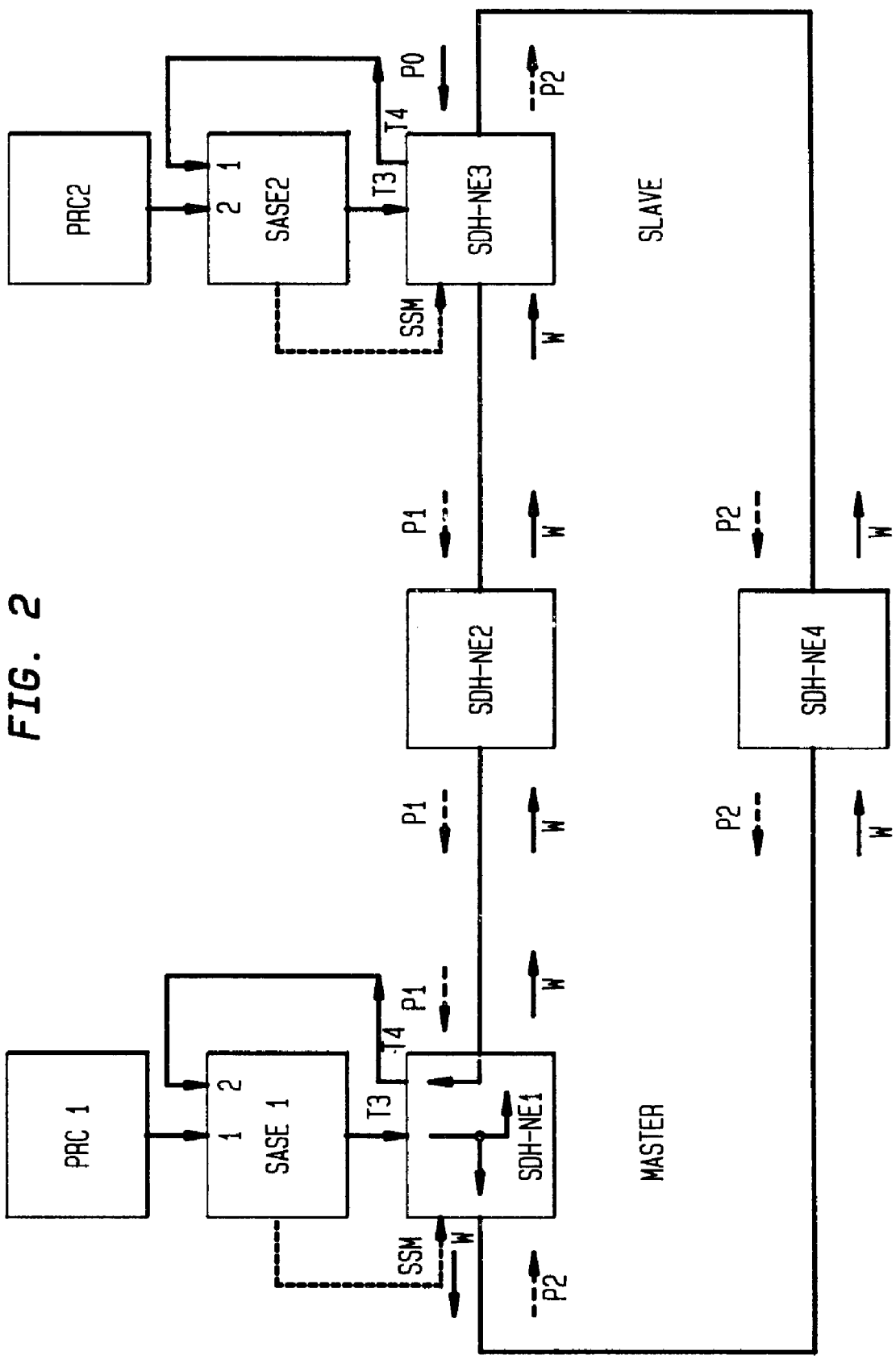
FIG. 2 illustrates reference clock distribution.
Figure 3:
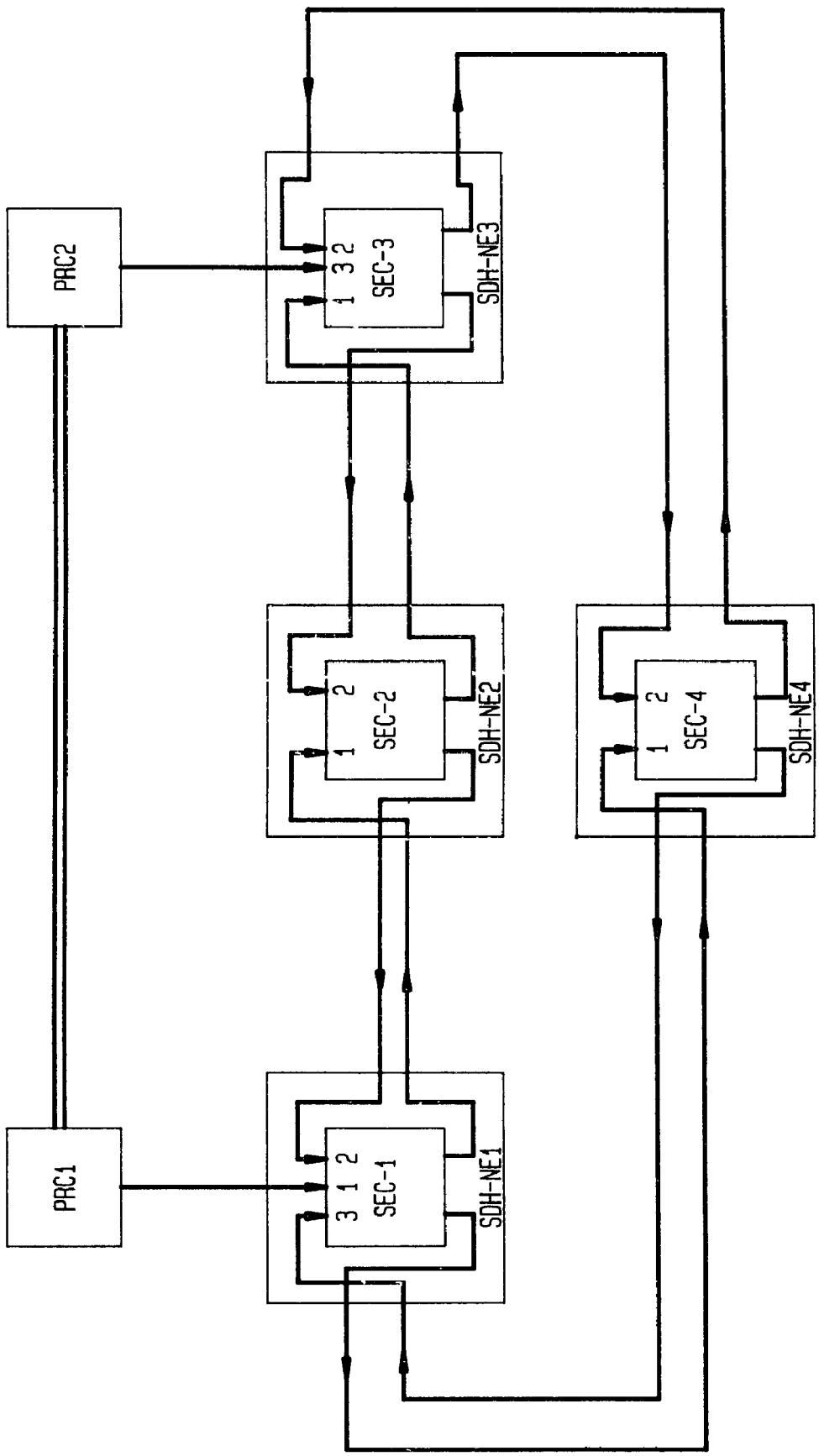
FIG. 3 illustrates reference clock distribution using the Synchronous Equipment clock portion of the Network Elements.
Figure 4:
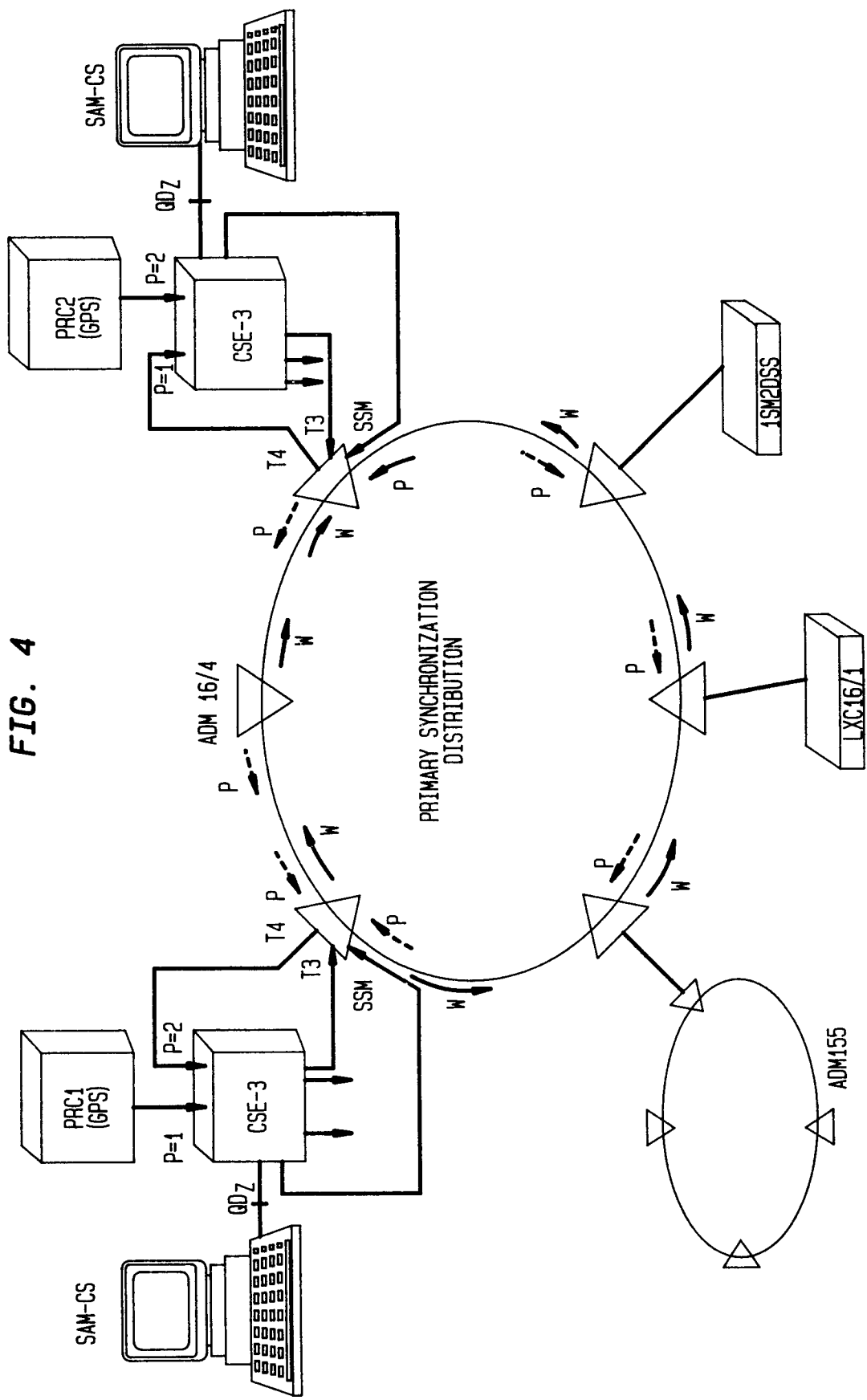
FIG. 4 illustrates CSE-3 Synchronization Distribution, Protection and Management.

According to FIGS. 2 and 4 the clock generator PRC1, which functions as master, feeds the primary clock into the network, with all SDH network elements SDH $Ne_n$ being fed the network clock by this clock source PRC1. The signal path of the clock supply runs, starting at the clock source PRC1, via the priority-1-input of an SASE1 (Stand Alone Synchronization Equipment) and via T3 to the SDH network element SDH-Ne1. This latter feeds all STM-n outputs with this clock. The network element SDH-NE3 receives the clock quality SSM=G.811 (Synchronization Status Message) over the network element SDH-NE2 as working route (W) and via the network element SDH-NE4 over the substitute route (PO). The network element SDH-NE3 further sends via T4 the clock received over the working route W (Working) via the priority 1 input, to the equipment SASE2. Due to the existence of a priority 1 input signal, the priority 2 input signal of the second clock source PRC2 remains ignored in normal operation.

If now, due to an interference with the operation, the clock source PRC1 drops out, the priority-1 signal of equipment SASE1 is absent as well. The priority-2 signal of equipment SASE1 is not extant at this time, because the network element SDH-NE2, as well as the network element SAH-NE4, transit the information SSM=DNU (Do Not Use for Timing). However the signal at T3 of the network element SDH-NE1 does not drop out, because the equipment SASE1 passes to the "holdover" state. Inasmuch as the network element SDH-NE1 cannot recognize from the T3 sine-signal which clock quality it has, the information SSM=G.812T is communicated to this network element SDH-NE1 via the SSM control line. Thereupon the network element SDH-NE1 enters this quality step into the SSM-byte of all STM-n signals, where n stands for 1, 2, 4, 16, 64 according to Recommendation ITU-T G.707. By this all network elements connected to the network element SDH-NE1 learn this change of the clock quality and can, in turn, react thereto. The network element SDH-NE3 disconnects thereupon the T4 clock output, since it receives this clock quality on the working route W as well as on the protection route PO.

The equipment SASE2 now switches over to the priority-2 clock input and sends further a clock of the quality step SSM=G.811 via T3 to the network element SDH-NE3. Via the control line SSM the clock quality SSM=G.811 is signaled further on. The network element SDH-NE3 issues on all outgoing STM-n signals the clock quality SSM=G.811. Thereupon all other network elements SDH-$NE_n$ become synchronized to the new clock issuer, i.e. to the network element SDH-NE3. The latter is now supplied with the replacement primary clock PRC2 by the clock source PRC2 via equipment SASE2. The network element SDH-NE2 now receives via the protection route P1, as well as also via the working route P2, clock signals of SSM=G.811 quality.

In order to prevent a clock loop via the equipment SASE1 and a reverse synchronization to a "pseudo"-PRC1, a distinction of equipments SASE1 and SASE2 must occur. The reason therefore is that the signal effects at the priority-2 input of the equipment SASE1 a disconnection of the holdover, which fact is equivalent to the return of the PRC1 signal. The distinction can occur through the fact that the equipment SASE1 is declared functionally as master, and the equipment SASE2 as slave. The equipment SASE1 may, therefore, only issue again a clock signal of quality SSM=G.811 from its control line after the return of the priority-1 input. This means that the equipment SASE1 may not issue, in the case of replacement switching, the quality step SSM=G.811, although it corresponds to that. It is possible to designate this quality step, for example, as SSM=undefined. Another alternative would be to associate strongly the quality step SSM=G.812 with priority-2 input. The equipment SASE2 does not require this distinction. This function can, correspondingly, also be implemented into the network element SDH-NE1, although, from the point of view of network planning, this appears as somewhat unclear.

The equipment SASE1 and SASE2 (Stand Alone Synchronization Equipment) shown in FIG. 2 each [comprise] an independent synchronization equipment as carrier of clock supply unit SSU (Synchronization Supply Unit). An SSU is a logical function which accepts synchronization inputs from various sources and selects one of these sources and filters it correspondingly, and issues the resulting signal outward. The properties of this filter function are established in recommendations ITU-T G.812 and ETSI DE/TM-3071-4. If all sources of synchronization disappear or are no longer usable for synchronization, the SSU sends its internal oscillator signal outward, having stored the last state of synchronization. This so-called "Holdover-Mode" must satisfy certain requirements which are likewise defined in the mentioned specifications. Inasmuch as the output signal of the SSU is derived from an external source of synchronization, it is also designated as a slave clock. The internal states of synchronization and operation offer information about the quality of the output signal. This state of synchronization can be signaled to the outside. This can occur via a network management interface, a service terminal, via a certain number of alarm contacts, or, under certain conditions, via the signal itself. If the output signal is a 2048 kbit/s signal, its quality can be coded in the so-called SSM (Synchronization Status Message) in the SA-bits of the data signal. This is described in ITU-T G-704. If the output signal is a 2048 KHz signal, there is a possibility of coding the clock quality directly in the signal.

Figure 1:
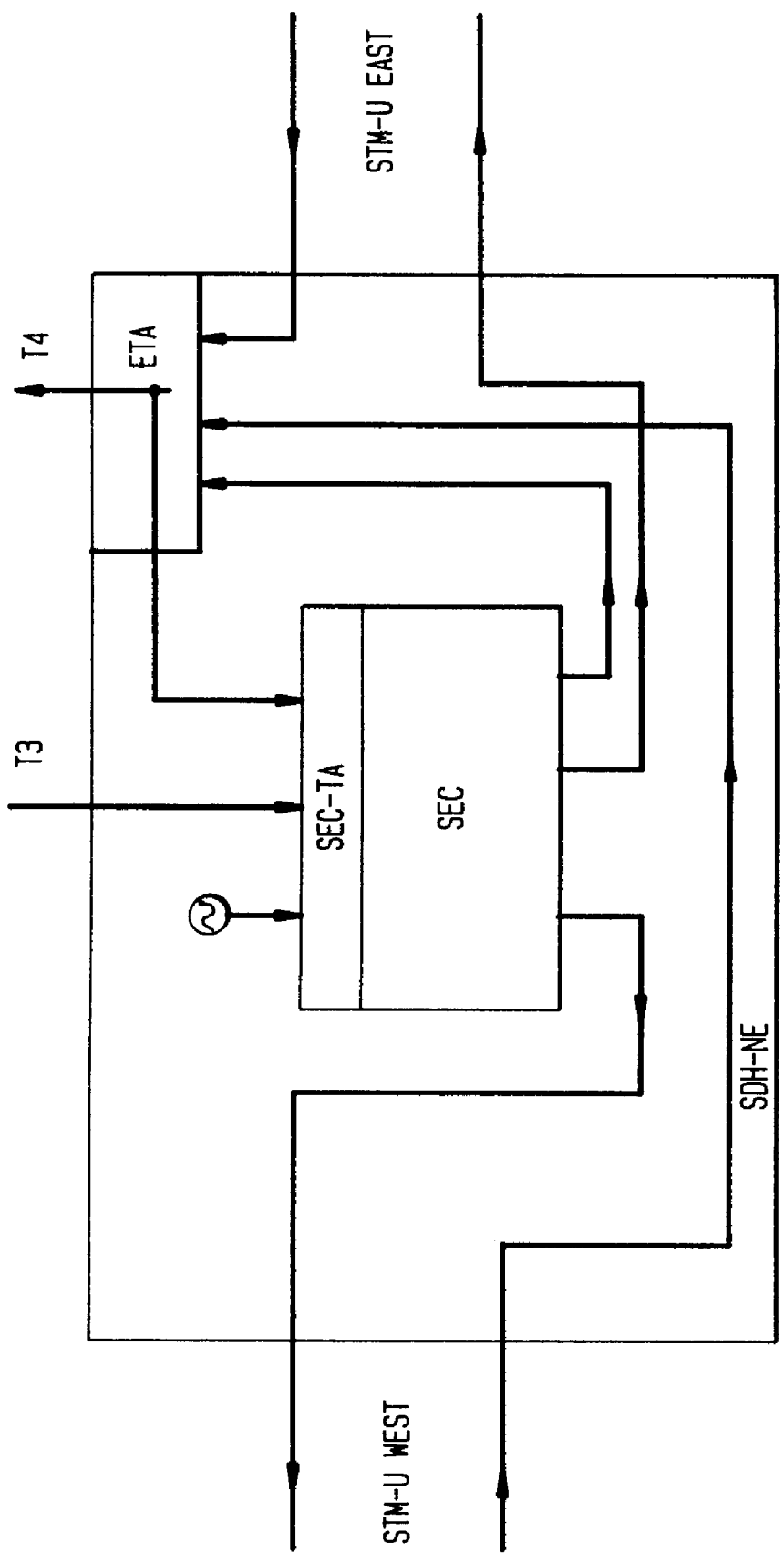
FIG. 1 is a block diagram of Synchronization Elements in a Network Element of the SDH network.

A network element SDH-NE (Network Element of the Synchronous Digital Hierarchy) with the function blocks essential for the synchronization is represented in FIG. 1. It comprises in the model shown here for a characteristic SDH-NE, the information inputs STM-n-East and -West as well as a function Block ETA (Input Clock Select) and a Function Block SEC (Synchronous Equipment Clock). The signal clock entering via the information inputs is selected in the ETA according to established or programmed characteristics of priority or of quality, and forwarded as T4 for internal or external further processing. T4 is at that time designated in ITU-T G.707 as a sine-shaped 2048 KHz signal. The signal priorities are customarily freely programmable. The clock-quality characteristics of the STM-n signals are customarily determined by the SSM (defined in ITU TG.707) contained in the signs However, they can also be programmed.

The clock selection in the function block SEC occurs similarly to the ETA. Customarily the SDH-NE internal oscillator has the lowest priority among the possible clock sources. It must be considered that in the neighboring SH-NEs the clock returned to the clock issuing SDH-NE must contain the information "DNU" as the SSM in order to avoid clock loops, A potential malfunction of the system is given by an exterior looping of the clock from T4 to T3. An internal clock loop from ETA to SEC-TA (SEC Clock Selection) and back again is prevented by programming technology.

| Abbreviations Used | |
|---|---|
| ANSI | American National Standards Institute |
| DNU | Do Not Use for Timing |
| ETA | Input Clock Selection |
| ETSI | European Telecommunication Standards Institute |
| GPS | Global Positioning System |
| ITU-T | International Telecommunication Union - Telecommunication Sector |
| PRC | Primary Reference Clock |
| SASE | Stand Alone Synchronization Equipment |
| SDH | Synchronous Digital Hierarchy |
| SDH-NE | SDH-Network Element |
| SEC | Synchronous Equipment Clock |
| SEC-TA | SEC Clock Selection |
| SSM | Synchronization Status Message |
| SSU | Synchronization Supply Unit |
| STM-n | Synchronous Transport Multiplex-n |
| UTC | Universal Time Coordinated |

The invention claimed is:

1. A method for switching between clocks in a network, comprising the steps of:
providing a first clock to a first network element belonging to a plurality of network elements;
distributing the first clock to the plurality of network elements through the first network element;
providing the first network element with an indication of a quality of the first clock;
distributing a message indicating the quality of the first clock to the plurality of network elements through the first network element;
providing a second clock to a second network element belonging to the plurality of network elements when the message indicates the quality of the first clock has decreased; and
distributing the second clock to the plurality of network elements through the second network element.

2. The method of claim 1, wherein the step of providing a first clock comprises:
providing a higher quality clock to the first network element; and
providing a lower quality clock to the first network element when the high quality clock malfunctions.

3. The method of claim 2, wherein the higher quality clock is relatively higher than the lower quality clock.

4. The method of claim 1, wherein the first clock is of a relatively higher priority than the second clock.

5. The method of claim 1, wherein the second clock is provided when the message indicates that the first clock is absent.

6. The method of claim 1, wherein the second clock is ignored when the first clock is present.

7. The method of claim 1, wherein both the first and second clocks are provided to respective first and second network elements and wherein the second clock is ignored when the first clock is present.

* * * * *